United States Patent [19]
Fujita

[11] Patent Number: 5,499,915
[45] Date of Patent: Mar. 19, 1996

[54] PRE-PLASTICIZING INJECTION MOLDING MACHINE

[75] Inventor: Shinji Fujita, Ishikawa, Japan

[73] Assignee: Sodick Co., Ltd., Kanagawa, Japan

[21] Appl. No.: 256,280

[22] Filed: Jul. 6, 1994

[30] Foreign Application Priority Data

Nov. 6, 1992 [JP] Japan .................... 4-322523

[51] Int. Cl.⁶ .................................. B29C 45/02
[52] U.S. Cl. ................... 425/557; 425/558; 425/559
[58] Field of Search .................... 425/557, 558, 425/559, 560

[56] References Cited

FOREIGN PATENT DOCUMENTS

| | | |
|---|---|---|
| 61-272119 | 12/1985 | Japan . |
| 2-12818 | 1/1990 | Japan . |
| 3-97518 | 4/1991 | Japan . |
| 4-147819 | 5/1992 | Japan . |

OTHER PUBLICATIONS

Plastics Extrusion Technology, Allan L. Griff, 1962, p. 8.

*Primary Examiner*—Tim Heitbrink
*Attorney, Agent, or Firm*—Wenderoth, Lind & Ponack

[57] ABSTRACT

Molten resin flows from the opening of a path and washes a closed space of an injection chamber to prevent molten resin from being retained therein. Resin leaking from between a peripheral wall of a cylinder and a head of an injection plunger is quickly exhausted. When a screw retreats, molten resin is delivered from the opening to the injection chamber through the path. Resin from the opening causes a flow that washes and agitates resin remaining in the closed space opposite a nozzle hole, since a front face of the plunger is conical in shape with a protruding or higher center. There is a slight step between the plunger head and a shank of the plunger. The step scrapes resin which adheres on the cylinder peripheral wall to quickly exhaust such resin through a narrow clearance between the peripheral wall and the shank. The plunger head is coated with a ceramic.

11 Claims, 6 Drawing Sheets

PRE-PLASTICIZING INJECTION MOLDING MACHINE

BACKGROUND OF THE INVENTION

1. Field of the Invention

The present invention relates to a pre-plasticizing injection molding machine equipped separately with a plasticizing part and an injection part, and more particularly, to the shape of an injection plunger in the injection part.

2. Description of the Prior Art

A screw pre-plasticizing injection molding machine is, in general, provided with a plasticizing part having a screw, and an injection part having an injection plunger. Molten resin plasticized in the plasticizing part is supplied to an injection chamber of the injection part by way of a path and then is injected into the cavity of a metallic mold through a nozzle by the injection plunger. Conventionally, there is provided a ball check valve in the path to prevent resin in the injection chamber from flowing back to the plasticizing part at the time of injection by the injection plunger.

Since the pre-plasticizing injection molding machine is equipped with an independent plasticizing part, it has a higher plasticizing capacity than an in-line injection molding machine. In particular, the pre-plasticizing injection molding machine works effectively in high-cycle molding operations, although molten resin may be retained because of the ball check valve. There is something left to be desired when handling such matters as they easily are subject to thermal cracking.

Recently, there has been proposed a pre-plasticizing injection molding machine with no ball check valve to eliminate the above problem. This injection molding machine is equipped with a rotary motor to turn a mixing screw and an actuator to axially move the screw. When plasticizing and weighing, the screw retreats to produce an opening between the screw front end and the path. Molten resin is supplied to the injection chamber of the injection part. When injecting, the screw advances and a front end thereof closes the path opening, and molten resin thereby is prevented from flowing back to the plasticizing chamber. Such injection molding machine which keeps molten resin from flowing back by an advancing/retreating screw does not experience the problem of molten resin being retained because of a ball check valve. In addition, in enables accurate weighing as well as well stabilized plasticizing, and has characteristics of providing excellent molding condition reproducibility, rising, and stability. With this injection molding machine, CAD, CAM and CAI (computer aided injection molding) which associate a metallic mold manufacturing machine with an injection molding machine also are feasible.

As shown in FIG. 11, such prior injection molding machine has a hole 27 open to the center of a cylinder front wall 23a of injection chamber 17 and leading to an injection nozzle. A hole 30b opens to the front wall adjacent a peripheral wall 15a of the cylinder and leads to a plasticizing part through a path 30. An injection plunger 16' has a flat front face 16'f and a head or piston 16'a moving slidably in contact with the cylinder peripheral wall 15a and a shank or rod 16'b much smaller in diameter than the head 16'a.

At a pressure holding process which follows an injection process, there is produced a clearance of a few millimeters as a minimum amount of cushioning between the front face 16'f of the injection plunger 16' and the front wall 23a of the cylinder, providing a specified holding pressure on the molten resin. Thus, no sink mark is generated in the molding due to cooled resin in the cavity. After the holding process, weighing starts over when molten resin flows into the injection chamber 17 through the path opening 30b. The flow of resin from the path opening 30b pressures mainly the head 16'a as the front wall 23a and the head front 16'f are flat and parallel. As a result, no resin flows into a closed space opposite to the opening of the nozzle 27, as shown in FIG. 12. The flow of resin is diverted in the direction of arrows B, pushing the injection plunger 16'. Resin not washed by a new flow of resin may be retained thereby in the closed space A in contact with and on the front wall 23a. The retained resin may become thermally deteriorated, thus affecting molding adversely. In addition, rising may be inferior at the time of a color change.

Shank 16'b maintains friction on the head 16'a with the cylinder peripheral wall 15a within a specified range. Molten resin leaking from between the head 16'a and the cylinder peripheral wall 15a pools in a wide space D between the shank 16'b and the cylinder peripheral wall 15a, and is caused to form into a weir because of reciprocation of the injection plunger. Carburizing occurs due to heat generated in the cylinder, such that the leaked resin grows into a hard mass that cannot be removed easily. In addition, such a hard mass may force the injection plunger to move in an inclined manner which hinders smooth reciprocation.

If the injection plunger has the same diameter as the head, the contact area of the injection plunger with the cylinder peripheral wall will be wider, and the injection plunger will reciprocate in a heavier manner. The plunger will also suffer uneven wear and become grooved more readily, reducing its durability.

Such a problem occurs when a pre-plasticizing injection molding machine enables such problem-solving, accurate, efficient injection molting operation by using an advancing/retreating screw to prevent molten resin from flowing back.

The present invention aims therefore at providing a pre-plasticizing injection molding machine capable of solving the above problem by washing a closed space in the injection chamber with a new flow of molten resin from a path opening to prevent molten resin from being retained.

SUMMARY OF THE INVENTION

A pre-plasticizing injection molding machine according to the present invention includes a plasticizing part to plasticize synthetic resin material by rotating a screw in a heating cylinder, an injection part to weigh a plasticized material by retreating an injection plunger in an injection cylinder and to inject the plasticized material through a nozzle by advancement of the injection plunger. A path or passage connects a front end of a plasticizing chamber with a front end of an injection chamber. The screw is supported to be reciprocably movably in the heating cylinder and is connected with a reciprocating drive unit to enable the screw to advance/retreat to close/open the path. The path has an opening in a periphery of a front wall of the injection cylinder. A nozzle hole leading to the nozzle has an opening in a center of the front wall. The injection plunger has a head that is slidably in contact with a peripheral wall of the injection cylinder and a shank that is slightly smaller in diameter than the head. A front face of the head is higher at a center thereof than at a periphery thereof. Thus, plasticized material which is delivered into the injection chamber from the opening of the path flows as far as the side thereof opposite to the opening of the nozzle hole.

It is preferable that a difference x in diameter between the head and the shank of the injection plunger is within a range of 0.05<x<1.00 mm. Between the head and the shank is formed a step that is a scraper to remove plasticized material from the cylinder peripheral wall of the injection cylinder. Such scraped material is discharged through a narrow gap between the shank and the peripheral wall. It is also preferable that the injection plunger is provided with a ceramic coating, such as TiC, TiCN, TiN, at least at the head.

While the screw of the injection molding machine is at a retreat position at the time of weighing, plasticized material in the plasticizing chamber is supplied to the injection chamber by way of the path. When weighing starts, there is clearance of some millimeters between the injection plunger front face and the cylinder front wall, and plasticized material coming from the plasticizing part passes into such clearance from the opening by way of the path. Since the plunger front face has a raised, higher center, a new flow of material from the path opening is caused to flow in a path causing it to agitate and wash any material remaining in the closed space opposite to the nozzle hole.

The injection plunger retreats in response to the delivery of plasticized material to the injection chamber from the path. Any resin that leaks from between the plunger head and the cylinder peripheral wall and adheres to the wall is removed by the stepped scraper and is exhausted quickly from the window through the gap with the shank.

At injection, the screw is advanced by the reciprocating drive unit to shut off the path. The injection plunger advances and moves smoothly along the cylinder peripheral wall, reducing leakage of plasticized material, since the head is ceramic coated. Durability of the injection plunger thus is improved.

DESCRIPTION OF THE PREFERRED EMBODIMENTS

Figure 1:
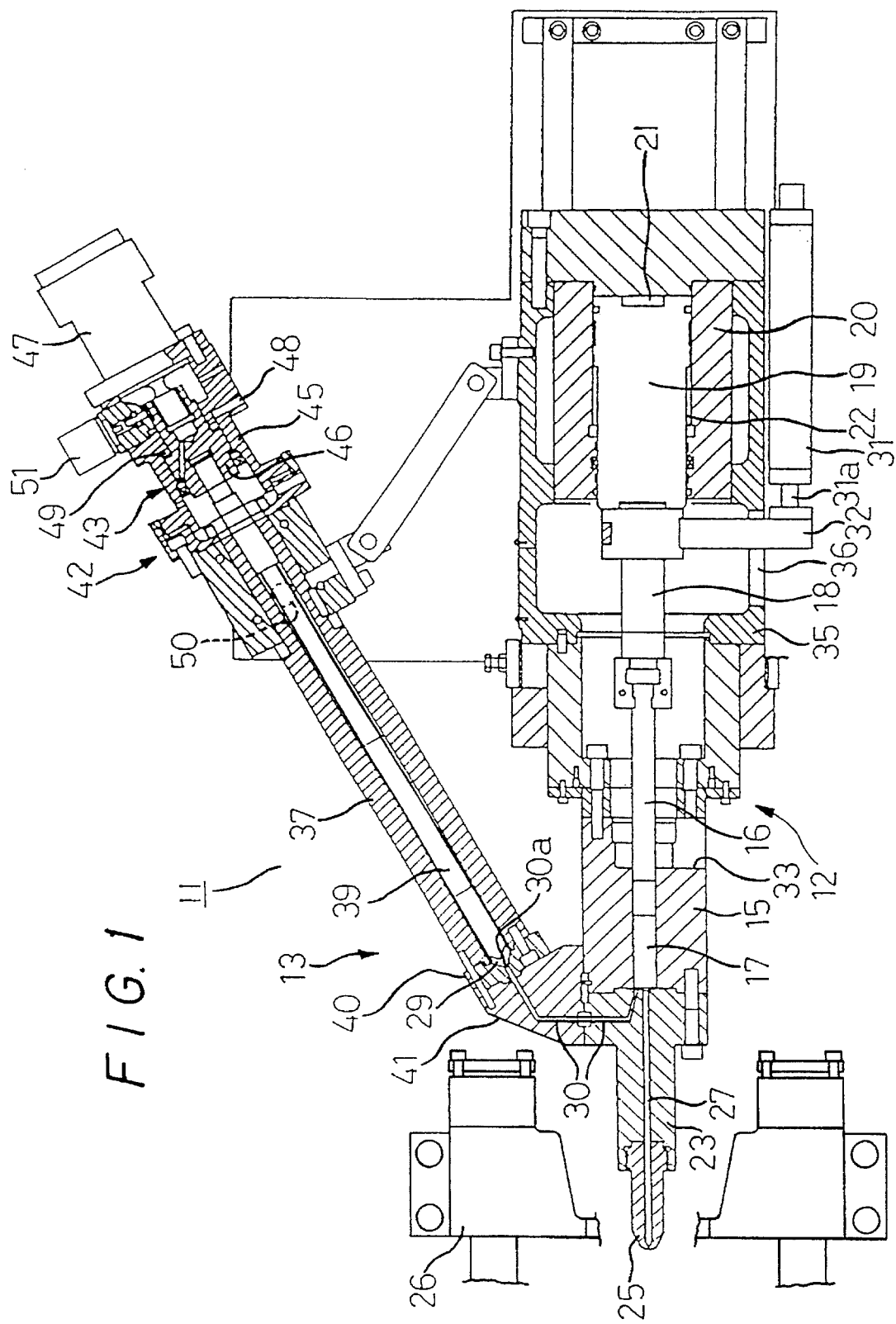
FIG. 1 is a sectional view showing a pre-plasticizing injection molding machine to which the present invention is applicable.

Referring to the drawings, the preferred embodiments of the present invention will be described.

As shown in FIG. 1, a screw pre-plasticizing injection molding machine 11 comprises an injection part or assembly 12 and a plasticizing part or assembly 13. The injection part 12 is equipped with an injection cylinder 15 and an injection plunger 16 inserted in the cylinder 15. Cylinder 15 and plunger 16 define an injection chamber 17. In addition, the injection plunger 16 is connected with a ram 19 by way of a rod 18. The ram 19 is fitted into a cylinder 20 and defines therewith an injection hydraulic chamber 21 and a return hydraulic chamber 22. A nozzle adapter 23 is secured to a front end of the injection cylinder 15. The nozzle adapter 23 is fitted with a nozzle 25 that contacts with and separates from an inlet of a metallic mold secured to a securing platen 26. The adapter 23 has therein a nozzle hole or passage 17 leading to the nozzle 26 and a transfer path or passage 30 leading to a plasticizing chamber 29 of the plasticizing part 12. The injection part 12 is provided with a linear scale 31, a mobile part 31a of which is connected with the rod 18 by way of an arm 32, to check the linear position of the injection plunger. The injection cylinder 15 has a window or opening 33 to exhaust leaked resin. A casing 35 also includes a window or opening 36 to allow penetration and movement of the art 32.

The plasticizing part 13 includes a heating cylinder 37 and a mixing screw 39 inserted for rotating and reciprocating movement in the cylinder 37. Plasticizing chamber 29 is defined by the cylinder 37 and the front end of the screw 39. In addition, a block 41 is secured to the front end of the cylinder 37 by way of a bracket 40. The block 41 secures the plasticizing part 13 to the injection part 12 at a certain angle and in a V-shape. Path 30 extends through block 41 and bracket 40, and an inlet or front end of the path 30 is open to the plasticizing chamber 29. In addition, the front part of the plasticizing chamber 29 is conical in shape, and a path opening 30a is situated at a smaller end of the conical shape, while the front end of the screw 39 is also conical in shape. When the screw 29 is at a retreated position, the opening 30a of the path 30 connects the plasticizing chamber 29 with the injection chamber 17. When the screw 39 advances, the front end of the screw closes the opening 30a, disconnecting the plasticizing chamber 29 from the injection chamber 17.

A screw reciprocating drive unit 43 is linked with the rear end of the heating cylinder 37 by way of a screw position adjuster 42. The screw reciprocating drive unit 43 comprises a cylinder casing 45 and a piston member 46, the piston member 46 being supported by the casing 45 to be rotatably and axially movably to a specified extent. The piston member 46 is linked at the front end thereof with the screw 39 and at the rear end thereof with a rotary motor 47 such as an AC electric or hydraulic motor for achieving rotation. Accordingly, rotation of the rotary motor 47 is transferred to the screw 39 by way of the piston member 46, which is advanced together with the screw 39 by the hydraulic pressure being applied to an oil chamber 49 by way of an oil path 48. A hopper hole 50 provides for the supply of resin material, while a rotary encoder 51 detects rotation of the screw.

The pre-plasticizing injection molding machine 11 is operable as follows. Rotation from the rotary motor 47 causes the screw 39 to rotate. Synthetic resin material coming from the hopper 50 is caused to be melted by being heated by the heating cylinder 37 and compressed by changes of spiral grooves provided in the screw 39. Such melted plasticized material is forwarded to the front end of the screw 39, which retreats due to the pressure of the molten material (referred to as polymer hereinafter). The front end of the screw 39 thereby forms a small clearance with the path opening 30a and the polymer flows into the injection chamber 17 of the injection part 12 by way of the path 30. Then the polymer pressure causes the injection plunger 16 to retreat in the injection chamber 17, wherein the polymer can be pooled and weighed, when the injection plunger 16 thus retreats, the screw 39 stops rotating and hydraulic pressure is supplied at the same time to the hydraulic chamber 49 of the screw reciprocating drive 43 unit to advance the screw 39 that the front end thereof closes the path opening 30a. When hydraulic pressure is supplied to the injection oil chamber 21, the ram 19 advances, thus also advancing the injection plunger 16. Thereby, the polymer in the injection chamber 17 is injected through nozzle passage 27 in the injection nozzle 25 into the cavity of a metallic mold. Part of such polymer may try to flow back to the plasticizing chamber 29 by way of the path 30, but this is not allowed because the opening 30a of the path 30 is closed by the front end of the screw 39.

The injection pressure is maintained while the molding in the cavity is cooled before the metallic mold is opened to allow the molding to be extruded or removed with a pick-up machine. The screw 39 rotates again to melt synthetic resin material, and weighing starts by removing hydraulic pressure from the injection chamber 21, and from the hydraulic chamber 49 the hydraulic pressure working on the piston member 46, and by rotating the rotary motor 47.

Referring now to FIG. 2 through FIG. 5, the injection plunger of the present invention will be described.

Figure 2:
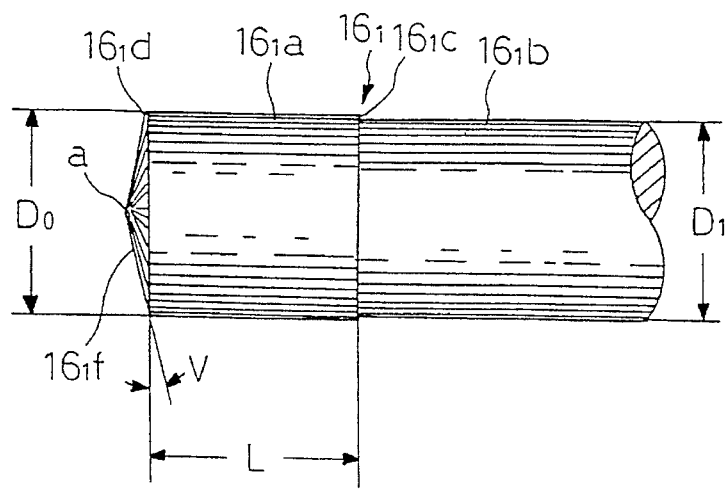
FIG. 2 is an elevation view showing an injection plunger of a first embodiment of the present invention.
Figure 3A:
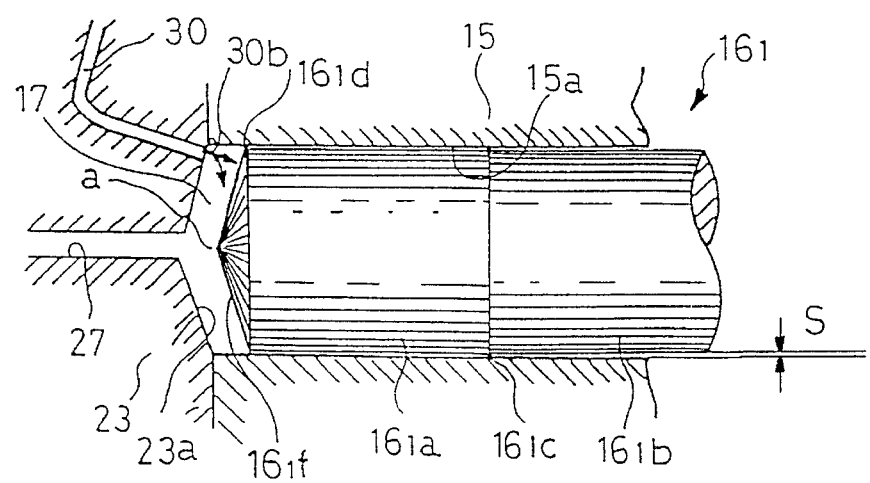
FIGS. 3(a) and 3(b) are a partially sectional elevation view showing an injection chamber equipped with the plunger and an axial view of the injection chamber.

FIG. 2 shows an injection plunger $16_1$ of one embodiment of the present invention. The plunger $16_1$ comprises a head or piston $16_1a$ and a shank or rod $16_1b$. A front face $16_1f$ of the head $16_1a$ is conically convex with an obtusely angled apex a. As shown in FIG. 3(a), the head $16_1a$, of diameter $D_0$, moves slidably in contact with the cylinder peripheral wall 15a in the injection chamber 17. The shank $16_1b$ has a diameter $D_1$ that is slightly smaller than $D_0$ of the head. $D_0 - D_1 - 0.1$ mm, for example. Accordingly, there is produced a small clearance S of 0.05 mm between the shank $16_1b$ and the cylinder peripheral wall 15a. In addition, the length L of the head $16_1a$ is formed to be almost the same as or slightly greater than the diameter $D_0$ to provide a sufficient contact area with the cylinder peripheral wall 15a. The difference in diameter between the head and the shank $(D_0-D_1=x)$ is suitable within a range of $0.05<x<1.00$ mm.

A step $16_1c$ between the head $16_1a$ and the shank $16_1b$ operates as a scraper to remove polymer that leaks from between the head $16_1a$ and the cylinder peripheral wall 15a and that adheres thinly on the peripheral wall 15a. Since a peripheral portion $16_1d$ of the head front face $16_1f$ is defined as a conical surface of large conical angle, an angle V between such surface and a transverse plane through head $16_1a$ is 30 degrees or less, preferably 15 degrees or less. Thus, the edge of surface $16_1d$ acts as a scraper to remove polymer.

A front wall 23a of the adapter 23 constituting the front wall of the injection chamber 17 is formed to be conically concave with an angle of conicity similar to the conical angle of the plunger front face $16_1f$. Opening 30b of the path 30 is formed in the periphery of the front wall 23a adjacent to the cylinder peripheral wall 15a. Nozzle hole or opening 27 is formed at the center of the apex of the conical surface of the front wall 23a.

Figure 4:
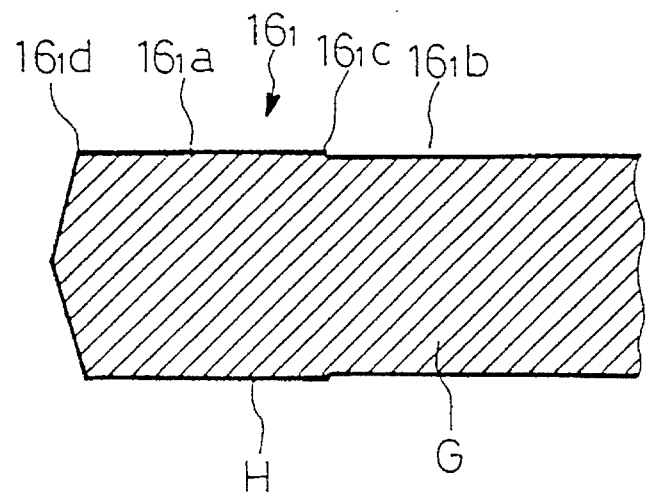
FIG. 4 is a longitudinal sectional view of the injection plunger.
Figure 5:
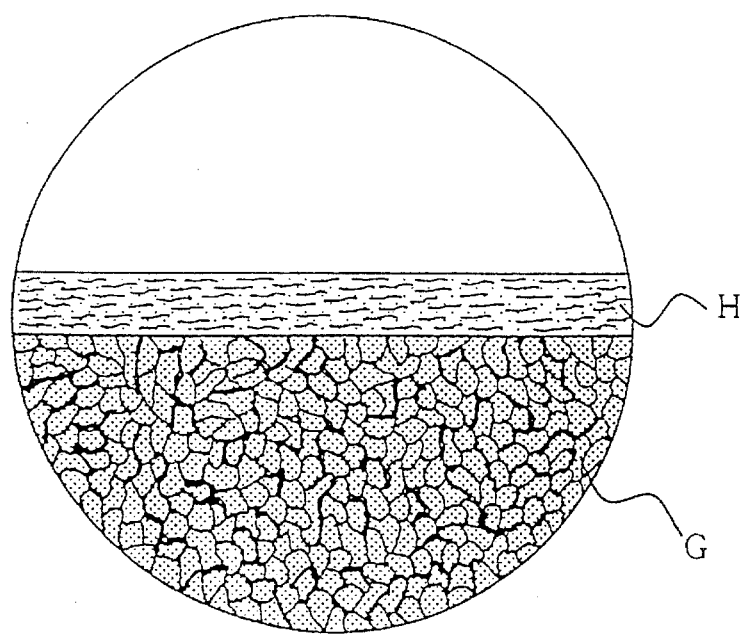
FIG. 5 is a partially enlarged end view of such section.

As shown in FIG. 4, the head $16_1a$, including front face $16_1f$, and the shank $16_1b$ of the injection plunger $16_1$ are coated with a ceramic such as TiC. Particularly, injection plunger base material G of tool steel (SKD11) is cut, subjected to heat treatment, ground and finished with buffing. Then the material G is coated with a ceramic H, such as TiC or TiN, to a film thickness of about 3 μm, using a physical vaporization device (PVD). Such coating also may be TiCN or $W_2C$, but TiC and TiN are preferable. In addition to a physical vaporization device, coating may be achieved by a chemical vaporization device (CVD). The thickness of the film preferably is between 2 μm and 6 μm.

With a coating of TiCN, the surface hardness (micro Vicker's hardness) of the injection plunger $16_1$ will be 3,000–2,500, and with a TiC coating it will be 3,800–3,000, i.e. much higher than conventional hard chrome plating (1,300–1,000). In addition, the ceramic coating H is highly adhesive to the base material G, is difficult to exfoliate and is finished to a mirror polish which provides an extremely low friction coefficient. The plunger thus is able to smoothly slide against the cylinder peripheral wall 15a. With use of a PVD, coating at a low temperature of approximately 500° C. is possible without later heat treatment, while assuring a constant film thickness, whereby it is possible to control the dimensional precision of the injection plunger in an accurate manner. Since the plunger is simple in shape, a PVD provides accurate and reliable vaporization.

It is sufficient to provide the ceramic coating on the periphery and front face $16_1f$ of the head $16_1a$ of the injection plunger $16_1$, but as a practical matter some such coating also is applied to the shank $16_1b$. The thin coating layer on the shank $16_1b$ is continuous with the coating layer on the periphery of the head $16_1a$, and they have the same surface hardness. As a result, if polymer leaks from between the head $16_1a$ of the injection plunger $16_1$ and the injection cylinder 15 and into clearance S between cylinder 15 and the shank $16_1b$, it may be removed with ease therefrom because of the minute and hard surface layer, thus preventing gas (which readily generates rust) originating from the molten resin from affecting iron adversely. Further, if a wiper (not shown) is provided for cleaning purposes, polymer may be removed easily.

Figure 3B:
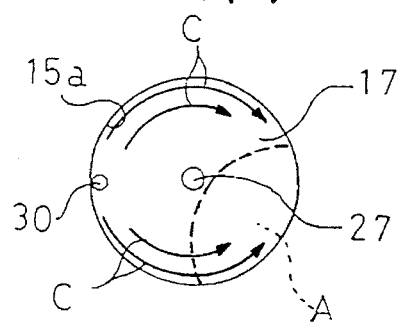

According to the present embodiment thus composed, the injection plunger is spaced a few millimeters from the cylinder front wall 23a during the pressure holding process, thus maintaining the pressure at a specified level despite the fact that the resin in the cavity becomes cooled and shrinks. At start of the weighing operation after the pressure holding operation, polymer plasticized in the plasticizing part 13 is delivered into the injection chamber 17 through the opening 30a by way of the path 30 as shown in FIG. 3. There is produced then a clearance of a few millimeters in the injection chamber 17 between the plunger front face $16_1f$ and the cylinder front wall 23a. As shown in FIG. 3(b) by arrows C, polymer which is delivered from the path opening 30a arches almost along the cylinder peripheral wall 15a, flowing along the contour of the conical surface of the plunger front face. Polymer remaining in the closed space A in opposite to the nozzle hole 27 is agitated by the flow of polymer in the directions of arrows C. Thus, polymer remaining therein from the previous holding operation is mixed with new polymer, and causes the plunger $16_1$ to retreat. Namely, when the plunger $16_1$ advances, a layer of polymer which was removed from the cylinder peripheral wall 15a by the scraper formed of the head front corner edge $16_1d$ is mixed with a new flow C of polymer, while a layer of polymer which was on the plunger head front face $16_1f$ is exfoliated, washed and agitated by the new flow C of polymer.

As the injection plunger $16_1$ moves, a very small quantity of polymer leaks from between the plunger head $16_1a$ and the cylinder peripheral wall 15a and adheres to the cylinder peripheral wall 15a. However, such polymer is removed by the scraper formed of the step $16_1c$ between the shank $16_1b$ and the head $16_1a$ when the injection plunger $16_1$ retreats, and is pushed away successively through very narrow clearance S between the shank $16_1b$ and the cylinder peripheral wall 15a and exhausted by way of the window 33 without forming a weir. At a time of changing of materials, the injection plunger $16_1$ is retreated in the injection cylinder with a greater stroke than normal, such that the scraper step $16_1c$ removes polymer completely from the cylinder peripheral wall 15a and exhausts it through the window 33. That is, the scraper retreats to a full stroke of the ram 19 at the time of changing of colors or materials, and cleans the cylinder peripheral wall 15a by scraping all polymer therefrom.

In addition, as the injection plunger $16_1$ is coated with a ceramic, it is highly resistant to wear, allowing a proper control and maintenance of dimensional precision without regard to wear. Accordingly, it is possible for the plunger to provide accurate injection and to minimize polymer leakage from the plunger. The screw prevents polymer from flowing back when the screw advances and retreats. The pre-plasticizing injection molding machine of the invention separate plasticization from injection to provide accurate control. Thus, a machine equipped with such an injection plunger will satisfy needs for ultra-high precision and quality.

As a ceramic coating of low friction coefficient is provided at the periphery of the head $16_1a$, the plunger $16_1$ moves in smooth contact with the cylinder peripheral wall 15a, thereby reducing loss of motive power and enabling accurate control without the plunger inclining, while enjoying an improved dimensional precision.

The injection plunger is of high hardness and has great dimensional accuracy and thus minimizes leakage of polymer. Any such leakage is scraped and exhausted by the step $16_1c$.

Another, partially changed embodiment of the invention now will be described, with a suffix "2" being employed in the same symbols employed for the above embodiment.

Figure 6:
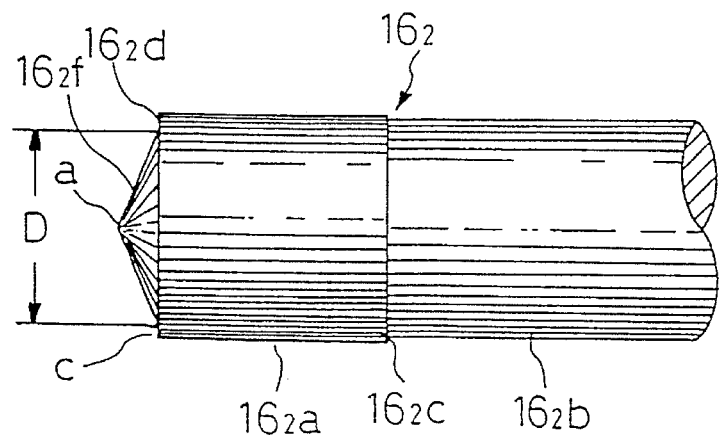
FIG. 6 is an elevation view showing an injection plunger according to a second embodiment of the present invention.

As shown in FIG. 6, the head front face $16_2f$ of the injection plunger $16_2$ is conical in a center portion with an apex a and has a flat peripheral face c. The flat face c forms a corner $16_2d$ with the peripheral surface of the head $16_2a$ equal to 90 degrees, thus promoting the scraper effect when the plunger advances. The apex a has a larger axial height or dimension to strengthen flow C of new polymer from the path opening 30b.

As a result, when the injection plunger $16_2$ advances, corner $16_2d$ acts as a scraper to remove polymer from the cylinder peripheral wall 15a. Inflow of new polymer from the path opening 30b causes a flow C around wide-angled central apex a, agitating polymer remaining in closed space A. Even if angle V formed between face $16_2f$ and the peripheral surface of head $16_2a$ (see FIG. 2) is 30 degrees or more, no force will acts to push polymer to the cylinder peripheral wall 15a when the plunger $16_2$ advances, because of flat face c between conical face $16_2f$ and the cylinder peripheral wall 15a.

Figure 7:
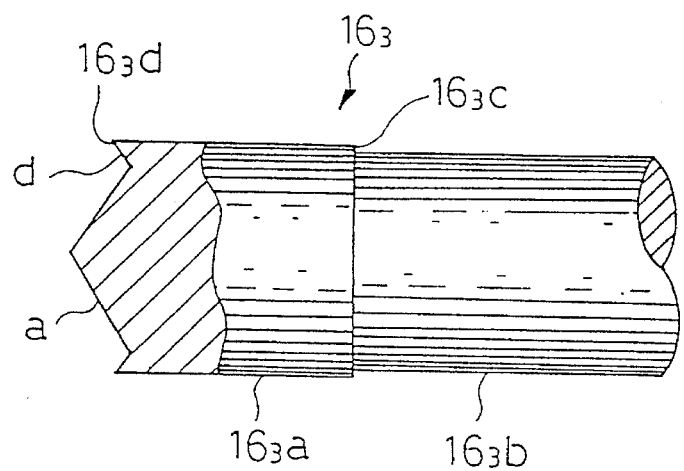
FIG. 7 is an elevation view, partly in section, showing an injection plunger of a third embodiment of the present invention.

Further, it may be possible to form the flat face to be a concave shape d and the corner $16_3d$ to be acute-angled, thereby to produce higher scraper effects, as shown in FIG. 7.

Figure 8:
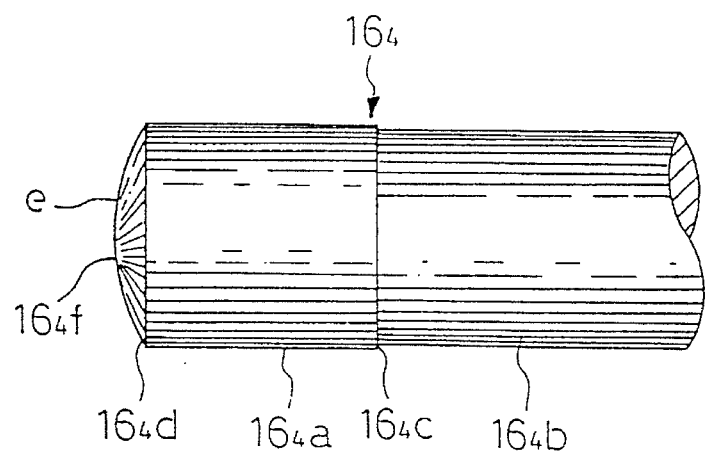
FIG. 8 is an elevation view showing an injection plunger of a fourth embodiment of the present invention.

FIG. 8 shows the front face $16_4f$ of another injection plunger $16_4$ having a spherical shape e. If the spherical shape e has a small radius of curvature, scraper effects will not be exhibited because the angle V (see FIG. 2) of the corner $16_4d$ is too great. Therefore, a relatively large radius of curvature is provided for shape e. It is also possible to form only the center of the face to be spherical and the periphery to be a flat shape c or a concave shape d as shown in FIG. 6 and FIG. 7.

Figure 9:
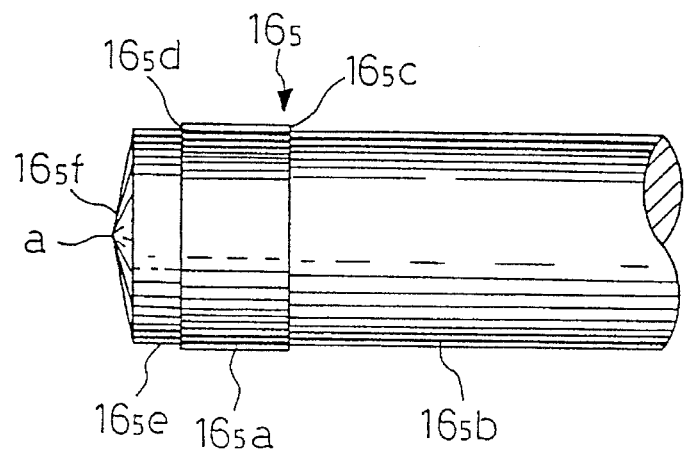
FIG. 9 is an elevation view showing an injection plunger of a fifth embodiment of the present invention.

FIG. 9 shows a bulged injection plunger $16_5$. The bulged part of the plunger $16_5$ forms a head $16_5a$ which moves slidably in contact with the cylinder peripheral wall. A stepped scraper $16_5c$ is formed between the rear side of head $16_5a$ and a shank $16_5b$. Forwardly of head $16_5a$ is formed a short projection $16_5e$ of the same diameter as the shank $16_5b$. A front face $16_5f$ of the projection is formed as a conical shape. A front scraper is composed of a step $16_5d$ between the projection and the head.

Figure 10A:
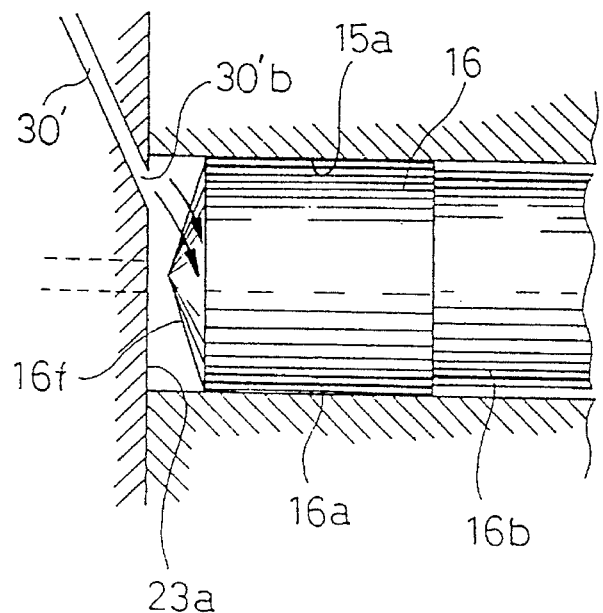
FIGS. 10(a) and 10(b) are views similar to FIGS. 3(a) and 3(b) but showing an injection chamber of a sixth embodiment according to the present invention.
Figure 10B:
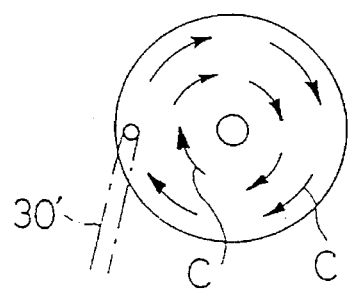

As shown in FIGS. 10(a) and 10(b), a path 30' from a plasticizing part is formed to slant tangentially relative to the center axis of the plunger. This causes polymer from the path opening 30'b to strike the injection plunger front face 16f in a slantwise direction, producing a unidirectional rotary flow of polymer as shown in FIG. 10(b) by arrows C. Consequently, polymer remaining in closed space A is well agitated, and the layer of polymer which is on the plunger front face 16f is exfoliated and washed.

Figure 11:
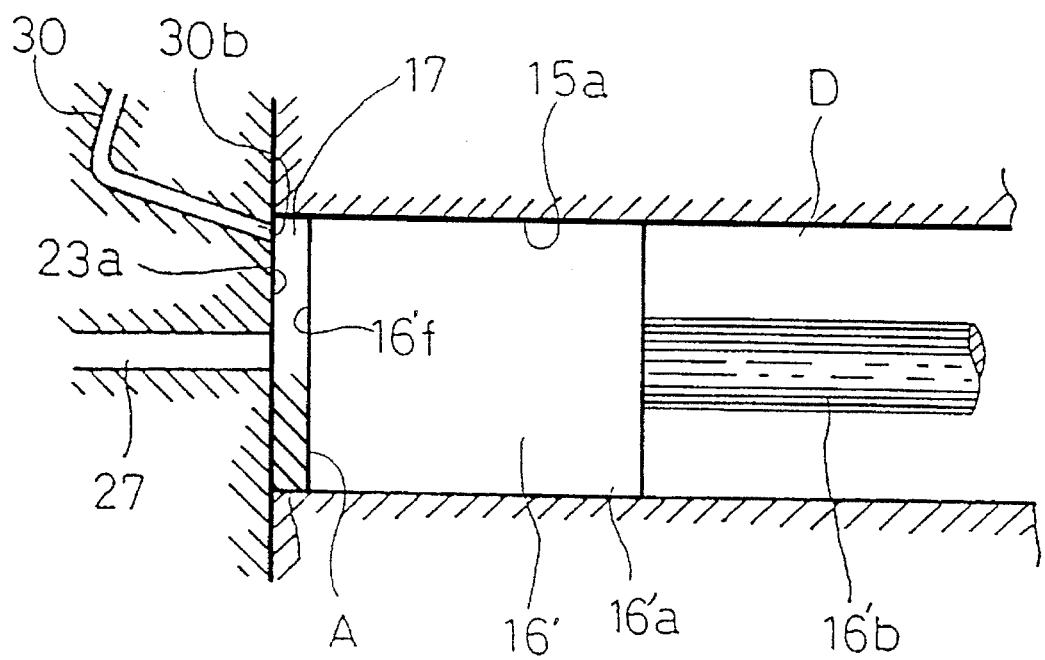
FIG. 11 is a partial sectional view of a conventional injection chamber.
Figure 12:
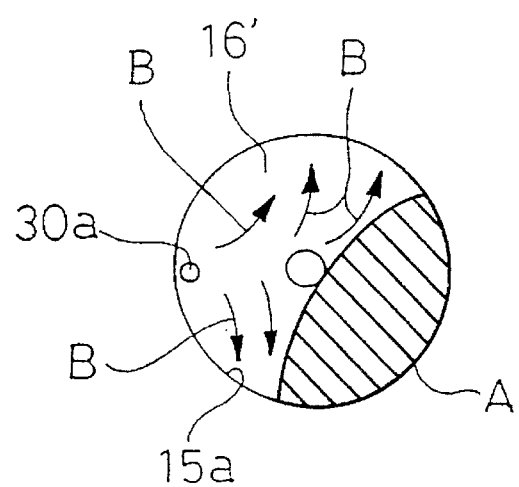
FIG. 12 is a schematic end view of the conventional injection chamber.

The cylinder front wall 23a may be formed to be flat as shown in FIG. 11, rather than conical as shown in FIG. 3. In such case, a circular cylindrical space will be produced between the cylinder peripheral wall and the plunger front face 16f when plasticized resin starts to be injected from the path 30 to allow newly injected resin to flow in a more steady manner.

According to the above embodiments, hydraulic pressure is used to advance and retreat the screw 39 in the plasticizing part 13, but a ball screw device and a rotary motor may be used for such purpose. The injection plungers shown in FIG. 6 through FIG. 10 are coated with a ceramic, at least at heads thereof.

According to the present invention as mentioned above, the front face of the injection plunger is formed to be higher in the center so that plasticized polymer which is newly delivered into the injection chamber through the path opening causes an arc flow of polymer, agitating and washing resin remaining in the closed space in opposition to the opening of the nozzle hole. As a result, no resin will be retained, thus preventing problems such as thermal deterioration due to retained resin. Quick rising is possible at the time of changing of colors as well.

Since the shank is slightly smaller in diameter than the head, has a specified rigidity and does not move slidably in contact with the cylinder peripheral wall, the area of contact of the head with the cylinder peripheral wall may be maintained within a specified range. The injection plunger may reciprocate in a lighter manner while maintaining rigidity. In addition, as seen from above, leaked resin may be well exhausted, preventing the injection plunger from moving in an inclined manner and from wearing unevenly. The durability of the injection plunger is promoted as well.

As the injection plunger includes a scraper formed of a step between the head and the shank, such scraper scrapes leaked resin from the cylinder peripheral wall when the injection plunger retreats. The leaked resin is then quickly exhausted through a narrow clearance between the shank and the cylinder peripheral wall, enabling the injection plunger to move in a smooth manner.

Since the injection plunger is coated at the head with a ceramic, a higher resistance to wear and a lower friction coefficient are obtained, thus improving dimensional precision. The injection plunger thereby may be controlled and maintained in a highly accurate manner, and it may move slidably in contact with the injection cylinder smoothly, enjoying a higher service life.

When the screw advances, the path is closed. This prevents resin from flowing back from the injection chamber at the time of injection well and accurately. Ultra-precision and ultra-high quality needs for injection molding may be satisfied by such effects, together with the pre-plasticizing injection molding machine which has excellent performance and control characteristics.

The injection molding machine according to the present invention as set forth above injects molten synthetic resin material into the cavity of a metallic mold to mold such material. In particular, the pre-plasticizing injection molding machine has a high reproducibility of molding conditions, and is applicable to ultra-precision, ultra-high quality and ultra-high cycle injection molding operation, with high computerized control available.

What is claimed is:

1. A pre-plasticizing injection molding machine comprising:

a plasticizing assembly including a heated cylinder, a screw rotatable within said heated cylinder to plasticize synthetic resin material within a plasticizing chamber therein, a transfer passage leading from said plasticizing chamber to transfer plasticized material therefrom, and a drive unit to reciprocate said screw within said heated cylinder between a retreated position, whereat said screw is spaced from said transfer passage to allow plasticized material to pass therethrough, and an advanced position, whereat said screw closes said transfer passage and prevents passage of plasticized material therethrough;

an injection assembly including a cylinder having an inner peripheral wall and a front wall, a plunger reciprocally movable within said cylinder and having a head with an outer peripheral surface in sliding contact with said inner peripheral wall of said cylinder, a shank of a diameter slightly less than that of said head and a front face confronting said front wall of said cylinder and defining therebetween an injection chamber, and a nozzle passage opening in a center of said front wall and leading from said injection chamber to an injection nozzle;

said front face of said plunger head having a conically convex configuration defining an obtusely angled central apex, and said front wall of said cylinder having a conically concave configuration substantially complementary to said configuration of said front face, with said nozzle passage opening in an apex of said concave configuration at said center; and said transfer passage opening into said injection chamber at a position at the periphery of said front wall immediately adjacent said inner peripheral wall and spaced along said front wall from said nozzle passage, to thereby, when said screw is in said retreated position thereof, introduce plasticized material from said plasticizing chamber into said injection chamber, and to cause the thus introduced plasticized material to flow therein in an annular path around said apex of and following the contour of said conically convex front face of said plunger head to an area of said injection chamber on a side of said nozzle passage opposite said transfer passage, such that said flow of introduced plasticized material agitates and mixes with any plasticized material remaining on said front face in said area from a previous operation cycle, whereafter said plunger is movable toward said front face to inject the thus introduced and mixed plasticized material from said injection chamber through said injection passage to said injection nozzle.

2. A machine as claimed in claim 1, wherein, between operations of movement of said plunger toward said front face, said plunger is movable in a retreating direction away from said front face, and further comprising a step between said head and said shank, thereby defining a narrow annular clearance between said shank and said inner peripheral wall, and a scraper defined by an edge of said head at said step and operable, upon movement of said plunger in said retreating direction, to scrape from said inner peripheral wall any plasticized material having intruded between said inner peripheral wall and said outer peripheral surface of said head, whereby such scraped plasticized material is exhausted through said clearance.

3. A machine as claimed in claim 2, wherein said clearance is 0.025 mm to 0.500 mm.

4. A machine as claimed in claim 1, wherein a difference between said diameters of said head and said shank is 0.05 mm to 1.00 mm.

5. A machine as claimed in claim 1, further comprising a ceramic coating on said front face and said outer peripheral surface of said head and on said shank.

6. A machine as claimed in claim 5, wherein said ceramic coating is selected from the group consisting of TiC, TiCN and TiN.

7. A machine as claimed in claim 1, wherein said conically convex front face extends at an angle of no more than 30° to a plane extending transverse to said plunger head.

8. A machine as claimed in claim 7, wherein said angle is no more than 15°.

9. A machine as claimed in claim 1, further comprising a scraper formed by an edge between said outer peripheral surface and said front face.

10. A machine as claimed in claim 1, wherein said front face further includes a planar annular surface extending around said conically convex configuration, said planar surface and said outer peripheral surface defining an edge forming a scrapper.

11. A machine as claimed in claim 1, wherein said front face further includes an annular concave surface extending around said conically convex configuration, said annular concave surface and said outer peripheral surface defining an edge forming a scrapper.

* * * * *

UNITED STATES PATENT AND TRADEMARK OFFICE
CERTIFICATE OF CORRECTION

PATENT NO. : 5,499,915
DATED : March 19, 1996
INVENTOR(S) : Shinji FUJITA et al.

It is certified that error appears in the above-indentified patent and that said Letters Patent is hereby corrected as shown below:

On the Title Page, delete "[22]  Filed:  Jul. 6, 1994" and replace it with the following:

--[22]  PCT filed:  Nov. 5, 1993

[86]  PCT No.:  PCT/JP93/01613

§ 371 date:  Jul. 6, 1994

§ 102(e) date:  Jul. 6, 1994

[87]  PCT Pub. No.:  WO 94/11174

PCT Pub. Date:  May 26, 1994--.

UNITED STATES PATENT AND TRADEMARK OFFICE
CERTIFICATE OF CORRECTION

PATENT NO. : 5,499,915
DATED : March 19, 1996
INVENTOR(S) : Shinji FUJITA et al.

It is certified that error appears in the above-indentified patent and that said Letters Patent is hereby corrected as shown below:

Column 10, line 12, change "face" to --wall--;

line 14, change "injection" to --nozzle--;
(second occurrence)
line 18, change "face" to --wall--;

line 19, change "face" to --wall--.

Signed and Sealed this

Thirteenth Day of May, 1997

*Attest:*

BRUCE LEHMAN

*Attesting Officer*   Commissioner of Patents and Trademarks